Patented Feb. 18, 1947

2,416,038

UNITED STATES PATENT OFFICE 2,416,038

PROCESS OF PREPARING FURFURYL ALCOHOL RESINS

William H. Adams, Jr., Newark, Del., ass'gnor to Haveg Corporation, Newark, Del., a corporation of Delaware No Drawing. Application August 3, 1944, Serial No. 547,971

15 Claims. (Cl. 260—67)

The present invention relates to a novel and advantageous process for the production of an initial, fusible, soluble, furfuryl alcohol condensation product which may be converted into an infusible, insoluble, furfuryl alcohol resin characterized by hardness, toughness, and chemical resistance. More particularly, the invention relates to a process by which the acid condensation of furfuryl alcohol can be controlled so that furfuryl alcohol condensation products of desirable properties can be obtained without undue violence of reaction.

Heretofore, the production of resins by the acid condensation of furfuryl alcohol has been suggested, but my investigation of the subject has shown that the condensation reaction has not been controllable for the production of resins of desired properties. Thus, in order to obtain a resin characterized by hardness and toughness, a relatively large amount of strong acid is required. The use of such an amount of acid, however, is hazardous due to the violence of the reaction and the tendency for spontaneous conversion of the condensation product into the infusible, insoluble condition. For example, relatively concentrated sulphuric acid, when added drop-by-drop to furfuryl alcohol, causes conversion of the furfuryl alcohol into the infusible, insoluble resin around the acid drops and may cause substantial conversion of the entire product. When a solution of sulphuric acid in an amount to give the desired properties is mixed with furfuryl alcohol, sufficient heat is developed to result in a very violent reaction which not only is uncontrollable but will reach explosive conditions unless great care is taken. On the other hand, if the reaction is carried out under too mild acid conditions, the resin obtained upon the conversion of the initial condensation product is of poor quality and is not satisfactory for commercial uses due to its weak nature and soft punky condition. These difficulties, particularly the violent nature of the reaction which has heretofore been encountered when a product of optimum properties has been sought, have retarded the commercialization of furfuryl alcohol resins, in spite of their known superior hardness, toughness, and chemical resistance as compared to most heat-converted resins.

In addition, such furfuryl alcohol resins as have been obtained heretofore have often not possessed maximum strength and have been susceptible to appreciable shrinkage. As the result of my investigations, it has been found that the acid condensation of furfuryl alcohol involves an intermolecular condensation with the accompanying liberation of water, and that the liberated water, together with the uncombined furfuryl alcohol and other volatile components, is tenaciously held in the furfuryl alcohol condensation product. The presence of water and other non-resinophoric materials in the initial furfuryl alcohol condensation product at the time of the conversion of the product into the infusible, insoluble stage results in the aforesaid disadvantageous properties. Thus, these materials may be trapped in the resin during the conversion and a product of less than the maximum possible strength is then obtained. In addition, these materials may volatilize during the conversion of the resin or they may volatilize over a period of time at room or elevated temperature, after the conversion of the resin, causing porosity and shrinkage of the product and the formation of checks and cracks.

One object of the present invention is to provide a process for the production of a fusible, soluble, furfuryl alcohol condensation product by which the difficulties heretofore encountered in the acid condensation of furfuryl alcohol may be avoided and a product of desired properties may be readily obtained.

A further object of the invention is to provide a process for the acid condensation of furfuryl alcohol which is controllable to provide an initial condensation product which may be converted into an infusible, insoluble product characterized by hardness, toughness, and chemical resistance.

Still another object of the present invention is to provide a process for the production of a fusible, soluble, relatively anhydrous furfuryl alcohol condensation product capable of conversion into an infusible, insoluble product of maximum strength and of low volatile content, and consequently of low porosity, and low shrinkage.

Other objects will be apparent from a consideration of this specification and the claims.

In accordance with the present invention, the condensation reaction of furfuryl alcohol is controlled by the use of a solution of the acid catalyst in furfural (furfuraldehyde). In other words, instead of following the usual practice and adding the acid catalyst directly to the furfuryl alcohol which, as pointed out, results in a difficultly controllable reaction, the acid catalyst is first dissolved in furfural and the furfural solution of the catalyst is then added to the furfuryl alcohol. The introduction of the acid to the furfuryl alcohol in a solution of furfural is to be contrasted to its addition in water or other solvent furnishing an added impurity which either requires subsequent removal or remains in the resin to detract from its qualities. As pointed out previously, if an attempt is made to avoid the use of water or other solvent, the undiluted acid will not mix satisfactorily with the furfuryl alcohol and an explosion or the conversion of the resin around the droplets will occur. The use of the solution of the acid in furfural, however, provides only a resiniforic additive since furfural itself forms a resin in the presence of acid, although at a much lower rate and requiring more acid than furfuryl alcohol. Hence in proceeding in accordance with the present invention the acid is diluted to a point which provides a controllable reaction without the introduction of any impurity of a non-resiniforic nature, the furfural itself becoming part of the resinous product.

By the use of the solution of the acid catalyst in furfural, the tendencies for too violent a reaction on the one hand and for an insufficiently acid reaction to furnish a product of desired properties on the other hand are avoided. The reaction to produce the initial furfuryl alcohol condensation product is controllable by cooling the reaction mix or by conducting the reaction under vacuum as will be discussed hereinafter. In addition, the initial products obtained are convertible into infusible, insoluble resins of excellent hardness, toughness, and chemical resistance, and the process assures uniformity of the products obtained in production from run to run so that variations in the properties of the product may be avoided.

In the preferred embodiment of the invention, the initial condensation product obtained as the result of the controlled reaction is treated to reduce the water content of the product to a minimum to provide an initial product which can be converted into an infusible, insoluble resin of maximum strength and of low porosity and shrinkage.

The acid catalyst employed is preferably a strong acid catalyst such as sulphuric acid, phosphoric acid, sulphur chloride, and the like, since, as stated, resins of the most desirable properties are obtained with the use of strong acid catalysts. However, the process is applicable for use with other acid catalysts, including the weak acids, such as maleic and oxalic acids. The amount of acid catalyst dissolved in the furfural will depend on the amount of acid to be employed in the catalysis of the furfuryl alcohol and on the amount of furfural which it is permissible to add to the furfuryl alcohol without deleteriously affecting the properties of the product. In most instances, it will not be desirable to add more than 15% furfural to the furfuryl alcohol because as the amount of furfural increases above this percentage, the properties of the product tend to be deleteriously affected. In general, the amount of acid dissolved in the furfural will not exceed 10% to 15% by weight based on the furfural and usually the furfural solution of the acid will be a 5% or weaker solution.

Referring to the amount of acid catalyst dissolved in the furfural to be added to the furfuryl alcohol, the amount depends on whether the acid catalyst is a strong or a weak catalyst. In the case of a strong acid catalyst, the furfural solution will provide between 0.05% to 1.00% acid, generally between 0.1% and 0.4% acid, based on the weight of the furfuryl alcohol. In the case of weak acid catalysts, the amount will usually be greater, for example from 5% to 10% acid based on the weight of the furfuryl alcohol. The solution of the catalyst in furfural may be mixed with the furfuryl alcohol in any desired manner, and the mixture is advantageously agitated during the reaction.

The furfuryl alcohol to which the solution of the acid catalyst in furfural is added will heat up spontaneously in a short time, and the reaction is then controlled by cooling to a temperature below 100° C. to avoid spontaneous conversion of the resin and an explosive reaction. Generally, the reaction is controlled between 40° to 80°, and more specifically between 50° C. and 70°. The cooling may be provided by external cooling such as by ice, cold water, or brine or by conducting the reaction under vacuum to establish an equilibrium, as described and claimed in copending application Serial No. 556,657, filed Sept. 30, 1944. When the reaction is controlled by external cooling, the initial, fusible, soluble resin, after completion of the reaction which is indicated by the cessation of the liberation of heat, may be separated from a portion of the water and other material present, if desired, by any suitable procedure, for example, by allowing the reaction product to settle and by separating the layers by decantation, siphoning, centrifuging, and the like.

When the reaction is controlled by vacuum, a vacuum, for example about 20 to 30 inches, is advantageously applied immediately after the addition of the solution of the catalyst in furfural. As the mass heats up due to the reaction, water is liberated, usually starting at a temperature in the neighborhood of 55° C. to 60° C. and at the same time heat is generated at a rate which depends on the temperature. Under the vacuum, the water is quickly distilled off and the reacting mass is cooled by the evaporation of the water at a definite rate so that the temperature of the reacting mass during the active condensation of the furfuryl alcohol is maintained within controllable limits. An equilibrium or substantial equilibrium is quickly established wherein the rate of loss of heat from evaporation substantially equals the rate of production of heat by the reaction of resinification. The point of balance of the equilibrium depends upon the rate of distillation and the amount and type of catalyst. As a result of the equilibrium conditions, water is smoothly distilled off and the reacting mass substantially maintained at its equilibrium temperature until resinification is practically complete. By this means, the temperature of the mass is controlled at a desired point. This control of the reaction by vacuum is described and claimed broadly in my copending application, Serial No. 556,657, filed Sept. 30, 1944. After completion of the condensation reaction, the reaction mixture may be used directly in the production of resinous products or the vacuum distillation may be continued, preferably under vacuum, to remove traces of water and other volatile matter as hereinafter described.

Unless the condensation product is rendered substantially free from acid, the initial resin obtained is a one-stage resin, that is, one which is convertible, due to the presence of acid therein, into an infusible, insoluble resin. If a two-stage resin is desired, the initial product is treated to counteract the effect of the acid. This is advantageously accomplished by adding a neutralizing agent to the reaction mixture or to the initial resin from which a portion of the water and other material has been removed in an amount to neutralize the resin. If care is taken, a non-reactive resin may also be obtained by continued washing of the resin with water but this is tedious and some loss of the product may result. The term "non-reactive initial resin" as used herein refers to the two-stage resins, that is, resins which contain insufficient acid to be heat-convertible but which may be rendered heat-convertible by the addition of acid. A two-stage resin is non-convertible by heat, and, in order to render it heat-convertible, additional acid must be added.

Either the one-stage or two-stage resin thus obtained may be used in the production of molded or laminated products, molded products made by the so-called "Haveg" process and other types of resinous products in accordance with standard procedures employed in the industry. The two-stage resin may also be utilized to advantage in accordance with the disclosure of copending application Serial No. 511,600, filed November 24, 1943, wherein the use of a latent catalyst for the conversion of a non-reactive furfuryl alcohol into the infusible, insoluble resin is disclosed and claimed.

In accordance with the preferred embodiment of the invention, the initial resin obtained either by controlling the reaction by external cooling or by vacuum is subjected to distillation, advantageously under vacuum, to reduce the water and other non-resinophoric constituents of the product in a low value. Generally, it will be desirable to distil a non-reactive initial resin but in the event the acid content of a reactive resin is relatively low and care is taken, such a resin may be subjected to distillation, although in most instances difficulties will be encountered in obtaining an anhydrous resin due to the tendency of the reactive resin to polymerize spontaneously.

As has been pointed out, my investigations have shown that water and other volatile substances are held tenaciously by the resin and that the presence of non-resinophoric materials in the initial resin results in a final converted product of less than maximum strength and one which is susceptible to shrinkage with the result that cracks or checks may develop in the product. For example, the resin prepared by controlling the reaction by external cooling and separated from a portion of the water and other material, as above described, contains a large amount of water and other volatile material; for example, such a resin may have a volatile loss of 25% to 40% or more, as determined by spreading a three-gram sample of resin over the surface of a shallow dish of about two inches diameter and heating without pressure for twenty-four hours at 150° C. The figures for volatile content hereinafter given are also based on this method of determination.

By distillation, preferably under vacuum, water and a portion of the other volatile material may be removed so that a substantially anhydrous product may be obtained with a volatile content due only to uncondensed furfuryl alcohol and partial condensation products. These materials, during the conversion of the initial resin into the infusible, insoluble product, particularly when a strong acid such as sulphuric or hydrochloric acid is employed as the polymerization catalyst, tend to be further condensed, and, hence, their presence in the initial resin does not interfere with the production of maximum strength and of minimum shrinkage, in other words, a substantially anhydrous resin. Although the resin may contain volatile material, the volatile material is resinophoric and hence the product will be substantially free from substances that will cause cracks, porosity and the like. The converted product is far more stable than is one which has not been subjected to distillation and is less liable to cracking and crazing. The volatile content of the initial resin will depend on the reaction conditions employed in the production of the initial resin, and the volatile content of the initial resin after distillation and of the converted resin will depend, of course, on the conditions of the distillation and also to some extent on the nature of the initial resin distilled. In all cases, however, the volatile content of the resin will be greatly reduced by the distillation treatment and, while the distillation may be stopped at any point desired, it is preferably carried on until a substantially anhydrous resin is obtained. As illustrative of the reduction in volatile content of the product, an initial resin of a volatile loss of about 25% to 40% or more may after vacuum distillation contain substantially no water and may have a volatile content of about 12% to 30%, which resin may be converted into an infusible, insoluble resin having a volatile content of from about 3% to 15%, it being understood that there is a substantial reduction in each stage and that, in general, the higher the volatile content in the resin distilled, the higher will be the volatile content in other stages.

The distillation is conducted in any suitable still provided with a source of heat, such as a steam jacket, and advantageously equipped with an agitator. The temperature and time factors will depend on whether a vacuum is employed, the degree of vacuum if employed, the nature of the resin being distilled, and the volatile content of the product desired. While the initial resin can be distilled, if desired, at atmospheric pressure, the use of a high vacuum is recommended, for example, from 20 to 30 inches of mercury, more specifically 25 to 30 inches of mercury. The temperature and time of treatment may vary from about 50° C. to 180° C. and from ten minutes to four or five hours respectively. This distillation is preferably carried out at about 26 inches to 28 inches of mercury to a temperature of about 150° C. which require about thirty-five minutes. In any particular distillation, the conditions thereof will be selected to obtain a resin of the properties desired and, as stated, advantageously one which is substantially anhydrous.

When the condensation reaction has been controlled by conducting the reaction under vacuum and a substantially anhydrous initial resin is desired, the vacuum distillation of the resin, preferably after neutralization, is advantageously continued in the still employed in the production of the condensation product until substantially all of the water has been removed.

The following examples are illustrative of the process of the invention, and while these examples include the step of vacuum distillation to produce the substantially anhydrous resin, it is to be understood that this step may be omitted if desired and the initial condensation product may be employed directly in the preparation of the final, infusible, insoluble product.

*Example I*

To 300 grams of furfuryl alcohol in a suitable flask, there was added 7.5 grams of a 10% solution of sulphur chloride dissolved in furfural. In thirty-nine minutes, the temperature rose spontaneously to 80° C., whereupon the reaction mixture was cooled to about 65° C. by immersion of the flask in ice water and the reaction mixture was maintained at this temperature for thirty-eight minutes. The reaction mixture was then distilled under a vacuum of 29 inches for twenty-five minutes, until the temperature rose to 88° C., at which point substantially all of the water had been removed. After cooling, the resin was moderately stiff and had a volatile content of 18.85% when dried in a shallow dish for twenty-four hours at 150° C. The substantially anhydrous resin polymerized very rapidly and could not be stored for any length of time. The initial resin upon subjection to heat was converted into a hard resin with markedly elastic properties. When the reaction mixture was neutralized prior to distillation, a non-reactive resin was obtained which could be stored indefinitely and after the addition of a small amount, for example .1% to .9% sulphuric acid, to the neutralized distilled resin, the reactivity was re-established and a heat-convertible resin provided.

*Example II*

To 400 grams of furfuryl alcohol in a two litre flask, there was added 20 grams of a 5% solution of sulphuric acid in furfural. The mixture warmed up rapidly to boiling and was cooled to 55° C. by immersion of the flask in cold water, and the reaction mixture was maintained at this temperature for thirty minutes. The reaction mixture was distilled under vacuum as described in the preceding example and the initial resin was somewhat thinner than that obtained in Example I, but its curing was about the same. Furthermore, like the product of Example I, it could not be stored, but a non-reactive resin was obtainable by neutralization as described in connection with Example I.

*Example III*

400 grams of furfuryl alcohol was placed in a two litre flask connected for vacuum distillation, and 12 grams of a 5% solution of sulphuric acid in furfural were added. Vacuum was immediately applied and in sixteen minutes, the temperature had risen to 58° C. and the reacting mass was boiling vigorously with water distilling off. After fifty minutes, the temperature had risen to 79° C. and the resin was becoming viscous. At this point, the vacuum was broken and 22 grams of a 5% solution of barium hydroxide (a slight excess) were added. The distillation was continued for fifteen minutes and then the resin was removed from the flask and cooled. The resin remained fluid for several weeks and was substantially non-reactive even after many hours at 150° C. However, when 5 grams of a 10% solution of sulphuric acid in furfural were added, the resin became potentially reactive and was converted to a solid, infusible, insoluble product when heated for five minutes at 150° C. The initial resin after the addition of the acid had a volatile content of 14.10%, determined as described in Example I, and at room temperature, it hardened in two days.

The polymerized resins obtainable in accordance with the present invention are characterized by excellent strength, together with toughness, and are distinctly superior to phenolic resins in these respects. In addition, they have a much greater range of chemical resistance than do phenolic resins, for example, they are resistant to strong and weak bases and acids, to salts, and to a much wider range of solvents.

Considerable modification is possible in the selection of the conditions of the condensation reaction, as well as in the conditions of the distillation (if employed), without departing from the essential features of the invention.

I claim:

1. The step in the process of preparing an initial, fusible, soluble, furfuryl alcohol resinous condensation product which comprises adding to furfuryl alcohol a solution of an active acid catalyst in furfural, the amount of furfural not exceeding about 15% based on the weight of the furfuryl alcohol.

2. The step in the process of preparing an initial, fusible, soluble furfuryl alcohol resinous condensation product which comprises adding to furfuryl alcohol a solution of an active strong acid catalyst in furfural, the amount of furfural not exceeding about 15% based on the weight of the furfuryl alcohol.

3. The step of claim 1 wherein the amount of strong acid catalyst added to the furfuryl alcohol is between about .05% and about 1.0% based on the weight of the furfuryl alcohol.

4. The process of preparing an initial, fusible, soluble, furfuryl alcohol resinous condensation product which comprises dissolving an active acid catalyst in furfural, the amount of furfural not exceeding about 15% based on the weight of the furfuryl alcohol, adding said furfural solution of the catalyst to furfuryl alcohol, reacting said mixture to provide a furfuryl alcohol condensation product, and during said reaction cooling said reaction mix.

5. The process of claim 4 wherein the acid catalyst is a strong acid catalyst, wherein the amount of strong acid catalyst added is between about .05% and about 1.0% based on the weight of the furfuryl alcohol.

6. The process of preparing an initial, fusible, soluble, furfuryl alcohol resinous condensation product which comprises dissolving an active acid catalyst in furfural, the amount of furfural not exceeding about 15% based on the weight of the furfuryl alcohol, adding said furfural solution of the catalyst to furfuryl alcohol, and reacting said mixture under a vacuum to form a furfuryl alcohol condensation product while controlling the temperature of said reaction mix by a substantial balance between the loss of heat from evaporation and the production of heat by reaction.

7. The process of claim 6 wherein the acid catalyst is a strong acid catalyst, wherein the amount of strong acid catalyst added is between about .05% and about 1.0% based on the weight of the furfuryl alcohol.

8. The process of preparing an initial, fusible, soluble, furfuryl alcohol resinous condensation product which comprises dissolving an active acid catalyst in furfural, the amount of furfural not exceeding about 15% based on the weight of the furfuryl alcohol, adding said furfural solution of the catalyst to furfuryl alcohol, reacting said mixture to form a furfuryl alcohol condensation product, during said reaction cooling said reaction mix, and distilling said condensation product to produce a substantially anhydrous product.

9. The process of claim 8 wherein the acid catalyst is a strong acid catalyst, wherein the amount of strong acid catalyst added is between about 0.05% and 1% based on the weight of the furfuryl alcohol, and wherein the distillation is conducted under a vacuum.

10. The process of preparing an initial, fusible, soluble, furfuryl alcohol resinous condensation product which comprises dissolving an active acid catalyst in furfural, the amount of furfural not exceeding about 15% based on the weight of the furfuryl alcohol, adding said furfural solution of the catalyst to furfuryl alcohol, reacting said mixture under a vacuum to form a furfuryl alcohol condensation product while controlling the temperature of said reaction mix by a substantial balance between the loss of heat from evaporation and the production of heat by reaction.

11. The process of claim 10 wherein the acid catalyst is a strong acid catalyst, wherein the amount of strong acid catalyst added is between about 0.05% and 1% based on the weight of the furfuryl alcohol, and wherein the vacuum distillation employed is continued to produce the substantially anhydrous product.

12. The process of preparing an initial, fusible, soluble, furfuryl alcohol resinous condensation product which comprises dissolving an active acid catalyst in furfural, the amount of furfural not exceeding about 15% based on the weight of the furfuryl alcohol, adding said furfural solution of the catalyst to furfuryl alcohol, reacting said mixture to form a furfuryl alcohol condensation product, during said reaction cooling said reaction mix, neutralizing said condensation product, and distilling said condensation product to produce a substantially anhydrous product.

13. The process of claim 12 wherein the acid catalyst is a strong acid catalyst, wherein the amount of strong acid catalyst added is between about 0.05% and 1% based on the weight of the furfuryl alcohol, and wherein the distillation is conducted under a vacuum.

14. The process of preparing an initial, fusible, soluble, furfuryl alcohol resinous condensation product which comprises dissolving an active acid catalyst in furfural, the amount of furfural not exceeding about 15% based on the weight of the furfuryl alcohol, adding said furfural solution of the catalyst to furfuryl alcohol, reacting said mixture under a vacuum to form a furfuryl alcohol condensation product while controlling the temperature of said reaction mix by a substantial balance between the loss of heat from evaporation and the production of heat by reaction, neutralizing said condensation product, and distilling said condensation product to produce a substantially anhydrous product.

15. The process of claim 14 wherein the acid catalyst is a strong acid catalyst, wherein the amount of strong acid catalyst added is between about 0.05% and 1% based on the weight of the furfuryl alcohol, and wherein the distillation is conducted under a vacuum to produce a substantially anhydrous product.

WILLIAM H. ADAMS, Jr.

REFERENCES CITED

The following references are of record in the file of this patent:

UNITED STATES PATENTS

| Number | Name | Date |
| --- | --- | --- |
| 1,665,237 | Trickey | Apr. 10, 1928 |
| 2,323,334 | Kauth | July 6, 1943 |
| 2,343,972 | Harvey | Mar. 14, 1944 |
| 2,345,966 | Fiedler | Apr. 4, 1944 |